US012443709B2

(12) United States Patent
Grover et al.

(10) Patent No.: US 12,443,709 B2
(45) Date of Patent: Oct. 14, 2025

(54) ANOMALY DETECTION BASED ON MULTI-LEVEL AUTHENTICATION

(71) Applicant: MICRO FOCUS LLC, Santa Clara, CA (US)

(72) Inventors: Douglas Max Grover, Rigby, ID (US); Michael F. Angelo, Houston, TX (US)

(73) Assignee: Micro Focus LLC, Santa Clara, CA (US)

( * ) Notice: Subject to any disclaimer, the term of this patent is extended or adjusted under 35 U.S.C. 154(b) by 11 days.

(21) Appl. No.: 18/451,304

(22) Filed: Aug. 17, 2023

(65) Prior Publication Data

US 2025/0061194 A1  Feb. 20, 2025

(51) Int. Cl.
*G06F 21/55* (2013.01)
*G06F 21/31* (2013.01)
*H04L 67/50* (2022.01)

(52) U.S. Cl.
CPC .......... *G06F 21/554* (2013.01); *G06F 21/316* (2013.01); *H04L 67/535* (2022.05)

(58) Field of Classification Search
CPC ..... G06F 21/554; G06F 21/316; H04L 67/535
USPC .......................................................... 726/23
See application file for complete search history.

(56) References Cited

U.S. PATENT DOCUMENTS

| 8,613,064 | B1 | 12/2013 | Roy | |
| 9,419,957 | B1* | 8/2016 | Rouse | H04L 63/10 |
| 11,570,169 | B2 | 1/2023 | Li | |
| 11,663,325 | B1* | 5/2023 | Zahavi | G06F 21/577 |
| | | | | 726/22 |
| 2019/0012441 | A1* | 1/2019 | Tuli | G06N 3/02 |
| 2020/0336503 | A1* | 10/2020 | Xu | G06F 11/0772 |

* cited by examiner

*Primary Examiner* — Tan Doan
(74) *Attorney, Agent, or Firm* — Sheridan Ross P.C.

(57) ABSTRACT

A determination is made to see if a user has authenticated to a computer system using a plurality of authentication levels. For example, the user may have had a first session where the user is authenticated at authentication level one and a second session where the user is authenticated at authentication level two. Behavior of the user is separately tracked at each of the plurality of authentication levels to identify separate usage patterns of the user at each of the plurality of authentication levels. Anomalous behavior of the user is identified based on one or more variations from the separate usage patterns of the user at, at least one of the plurality of authentication levels. An action is taken based on identifying the anomalous behavior of the user. For example, the user's account may be locked, or an administrator may be notified.

20 Claims, 8 Drawing Sheets

ANOMALY DETECTION BASED ON MULTI-LEVEL AUTHENTICATION

FIELD

The disclosure relates generally to anomaly detection and particularly to enhancing security of a computer/computer networks based on anomaly detection.

BACKGROUND

Detection of hacked accounts may be difficult at times using traditional anomaly detection. Existing anomaly detection processes identify anomalous behavior at a user level. While this is sufficient for identifying some types of anomalous behavior, it is still too limited to track specific types of anomalous behavior.

SUMMARY

These and other needs are addressed by the various embodiments and configurations of the present disclosure. The present disclosure can provide a number of advantages depending on the particular configuration. These and other advantages will be apparent from the disclosure contained herein.

A determination is made to see if a user has authenticated to a computer system using a plurality of authentication levels. For example, the user may have had a first session where the user is authenticated at authentication level one and a second session where the user is authenticated at authentication level two. Behavior of the user is separately tracked at each of the plurality of authentication levels to identify separate usage patterns of the user at each of the plurality of authentication levels. Anomalous behavior of the user is identified based on one or more variations from the separate usage patterns of the user at, at least one of the plurality of authentication levels. An action is taken based on identifying the anomalous behavior of the user. For example, the user's account may be locked, or an administrator may be notified.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U S C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

As described herein and in the claims, the term computer system, may include a communication device(s), a computer network(s), one or more applications, an operating system, a container(s), a virtual machine(s), and/or any electronic device/computer software.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
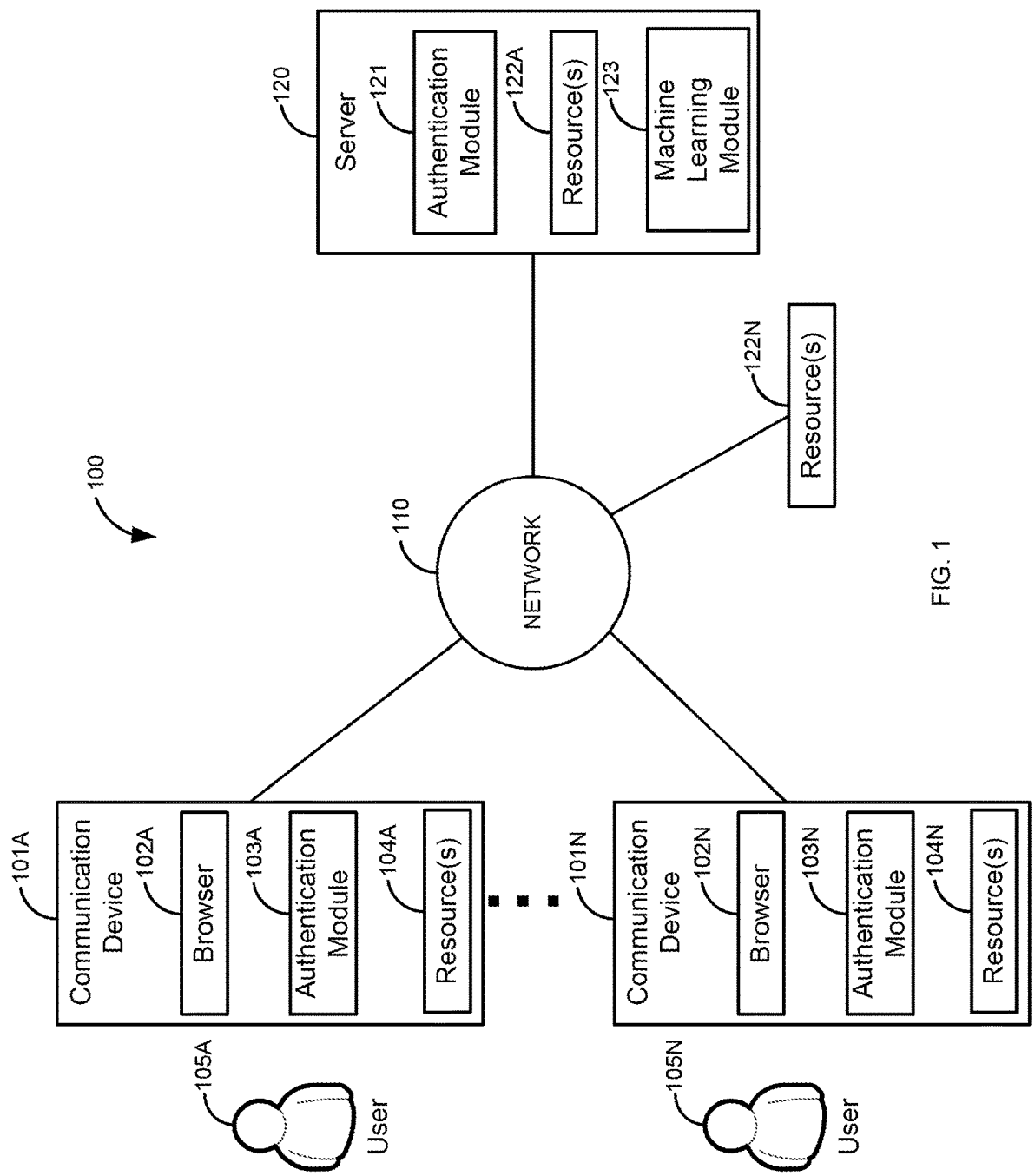
FIG. 1 is a block diagram of a first illustrative system for anomaly detection based on multiple authentication levels.

FIG. 1 is a block diagram of a first illustrative system 100 for anomaly detection based on multiple authentication levels. The first illustrative system 100 comprises communication devices 101A-101N, a network 110, a server 120, and resource(s) 122N. In addition, users 105A-105N are shown for convenience. The users 105A-105N are users of the communication devices 101A-101N and the resource(s) 104A-104N/122A-122N.

The communication devices 101A-101N can be or may include any user device that can communicate on the network 110, such as a Personal Computer (PC), a telephone, a video system, a cellular telephone, a Personal Digital Assistant (PDA), a tablet device, a notebook device, a smartphone, and the like. As shown in FIG. 1, any number of communication devices 101A-101N may be connected to the network 110, including only a single communication device 101.

The communication devices 101A-101N further comprise browsers 102A-102N, authentication modules 103A-103N, and resources 104A-104N. The browsers 102A-102N can be or may include any type of browser, such as Chrome®, Internet Explorer®, Firefox®, Safari®, Opera®, and/or the like. The browsers 102A-102N may provide access to use the resources 104A-104N/122A-122N.

The authentication modules 103A-103N may be any software/firmware that allows the users 105A-105N to authenticate and use/access the resources 104A-104N/122A-122N. The authentication modules 103A-103N may be provided by the server 120 (e.g., by a web page) via the browsers 102A-102N or may be separate from the browsers 102A-02N. For example, in one embodiment, the authentication modules 103A-103N may only access the resources 104A-104N. Alternatively, the authentication modules 103A-103N may provide access to any combination of the resources 104A-104N/122A-122N. The authentication modules 103A-103N may track how the users 105A-105N access the resources 104A-104N and/or the resources 122A-122N.

The resources 104A-104N may be any local resource 104A-104N that the user 105 can access when properly authenticated, such as disk space, applications, storage devices (e.g., a USB device), an attached printer, and/or the like. The authentication modules 103A-103N may grant access directly to the resources 104A-104N.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Transfer Protocol (HTTP), Web Real-Time Protocol (Web RTC), and/or the like. Thus, the network 110 is an electronic communication network configured to carry messages via packets and/or circuit switched communications.

The server 120 may be any hardware coupled with software that can host/manage the resources 122A-122N, such as a web server, a resource server, an application server, a cloud service, a security server, a database, a file sharing service, and/or the like. The server 120 further comprises an authentication module 121, the resources 122A, and a machine learning module 123.

The authentication module 121 can be or may include any process that can track how the users 105A-105N are using the resources 104A-104N/122A-122N. The authentication module 121 may also manage the authentication of the users 105A-105N. The authentication module 121 may work in conjunction with the authentication modules 103A-103N to authenticate the users 105A-105N at multiple authentication levels using various authentication credentials, such as a username/password, a fingerprint scan, an iris scan, a facial scan, a voiceprint, a one-time password (e.g., a Short Message Service (SMS) or email one-time password), and/or the like.

The resources 122A-122N can be any type of resource that an authentication level grants access to, such as, the server 120, a communication device 101, an application, an operating system, a container, a virtual machine, a database, a sensor, a printer, a scanner, a disk, a router, a firewall, a device, a network 110, an embedded device, and/or the like.

The machine learning module 123 can be or may include any hardware coupled with software that can be trained to identify anomalous behavior of the user 105. The machine learning module 123 may use supervised machine learning, unsupervised machine learning, reinforcement learning, and/or the like. The machine learning module 123 may track historical usage patterns of the user 105 as part of the machine learning process.

Figure 2:
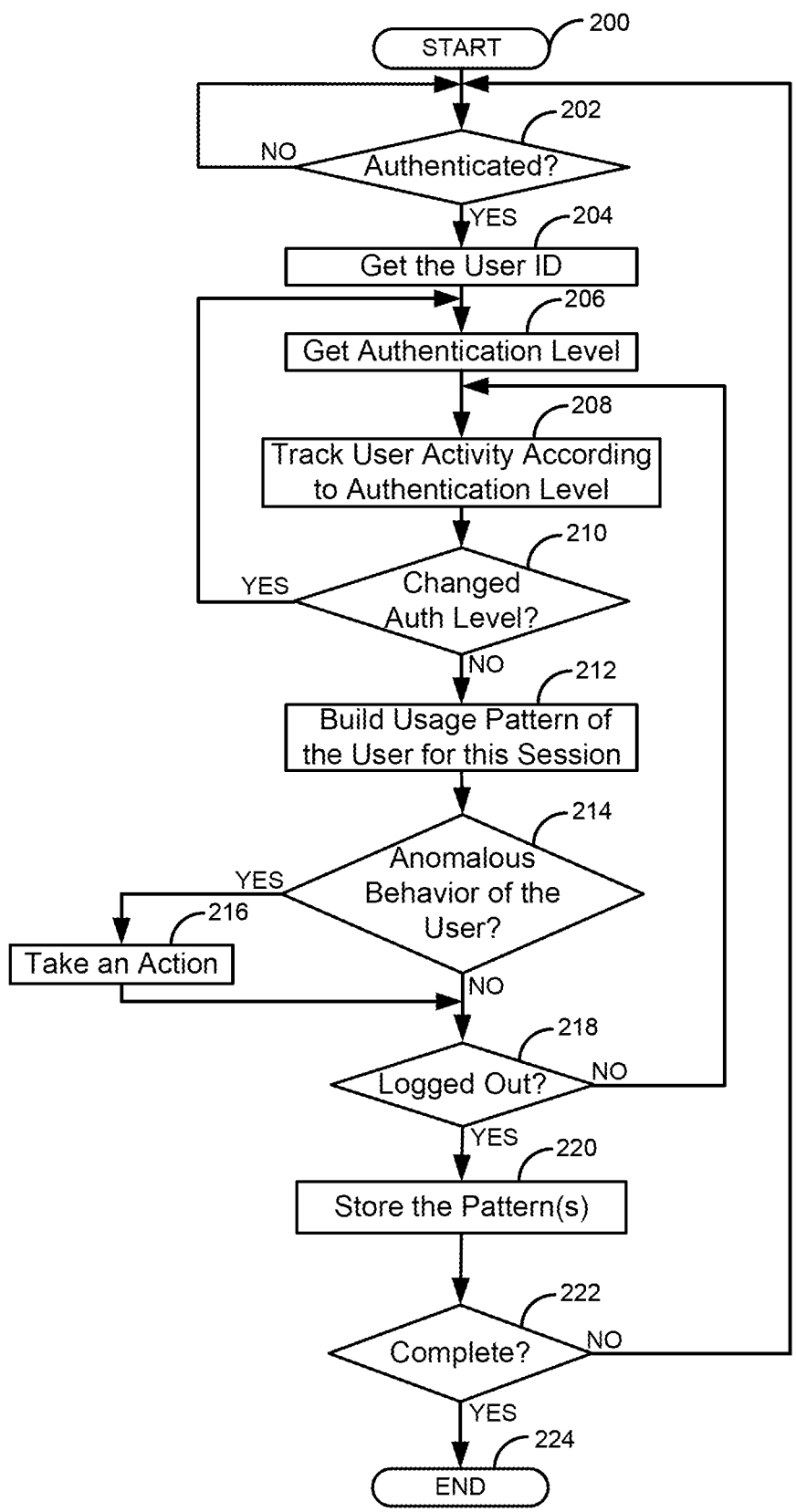
FIG. 2 is a flow diagram of a process for anomaly detection based on multiple authentication levels.

FIG. 2 is a flow diagram of a process for anomaly detection based on multiple authentication levels. Illustratively, the communication devices 101A-101N, the browsers 102A-102N, the authentication modules 103A-103N, the resources 104A-104N, the server 120, the authentication module 121, the resources 122A-122N, and the machine learning module 123 are stored-program-controlled entities, such as a computer or microprocessor, which performs the methods of FIGS. 2-8 and the processes described herein by executing program instructions stored in a computer readable storage medium, such as a memory (i.e., a computer memory, a hard disk, and/or the like). Although the methods described in FIGS. 2-8 are shown in a specific order, one of skill in the art would recognize that the steps in FIGS. 2-8 may be implemented in different orders and/or be implemented in a multi-threaded environment. Moreover, various steps may be omitted or added based on implementation.

The process starts in step 200. The authentication module 103 and/or 121 determines, in step 202, if the user 105 has authenticated. For example, the user 105 may be able to authenticate at three different authentication levels. For each authentication level, the user 105 typically has to provide different authentication credentials (e.g., a username/password for level one, a username/password and a fingerprint scan for level two, and a username/password and an iris scan for level three). If the user 105 has not authenticated in step 202, the process of step 202 repeats.

Otherwise, if the user 105 has authenticated in step 202, the authentication module 103 and/or 121 gets the user ID in step 204. The user ID is used to track information about what resources 104/122 the user 105 is accessing while logged in at a particular authentication level. The authentication module 103 and/or 121 determines, in step 206, the authentication level that the user 105 logged in with. For example, the user 105 may have provided a valid username/password and is now logged in at authentication level one. The authentication module 103 and/or 121 tracks, in step 208, the user's activity while the user 105 is at a specific authentication level. For example, if the user 105 is authenticated at level one, the authentication module 103 and/or 121 tracks which of the resources 104/122 the user 105 is accessing while authenticated at authentication level one.

The authentication module 103 and/or 121 determines, in step 210, if the user's authentication level has changed. For example, if the user 105 initially authenticated at level one, the authentication module 103 and/or 121 determines, in step 210, if the user 105 has now authenticated at a different level (e.g., at authentication level two). If the user's authentication level has changed in step 210, the process goes back to step 206 to get the user's new authentication level.

Otherwise, if the user's authentication level has not changed in step 210, the authentication module 103 and/or 121 builds a usage pattern of the user for this communication session in step 212. The usage pattern of the user is for what resources 104/122 the user 105 is accessing. For example, the usage pattern may include time accessed, an order of access, individual file access, individual application access, individual container access, individual virtual machine access, operating systems accessed, devices used, and/or the like.

The authentication module 103 and/or 121 determines, in step 214, if the usage pattern that is being built in step 212 shows an anomalous behavior of the user 105. The current behavior of the user 105 is compared to previous pattern(s) of the user 105 in previous communication sessions (e.g., where the machine learning module 123 is trained using previous valid patterns of the user 105). For example, historical learned usage patterns of the user 105 at the particular authentication level are compared the current usage pattern of the user at the same authentication level to identify any variations. Variances may be determined by thresholds, new resources being accessed, different time usage, and/or the like. If the usage pattern is determined to be anomalous in step 214, an action is taken in step 216. The action can be any related action, such as sending a message (e.g., notifying an administrator), logging the user 105 out of a computer system, locking an account, having an administrator validate that the user's authentication is valid by providing an administrator's credential, blocking an access level, and blocking access to a resource 104/122, and/or the like. The process then goes to step 218. Otherwise, if the behavior of the user 105 is not anomalous in step 214, the process goes to step 218.

The authentication module 103 and/or 121 determines, in step 218, if the user 105 has logged out. If the user 105 has not logged out in step 218, the process goes back to step 208 to continue to track the user's activity according to the current authentication level. Otherwise, if the user 105 has logged out in step 218, the authentication module 103 and/or 121 stores the user's pattern(s) in step 220. For example, if the user 105 is initially logged in at authentication level one and then further authenticated to level two, there will be a level one pattern and a level two pattern that are stored in step 220.

The authentication module 103 and/or 121 determines, in step 222, if the process is complete. If the process is not complete in step 222, the process goes to step 202. Otherwise, if the process is complete in step 222, the process ends in step 224.

Figure 3:
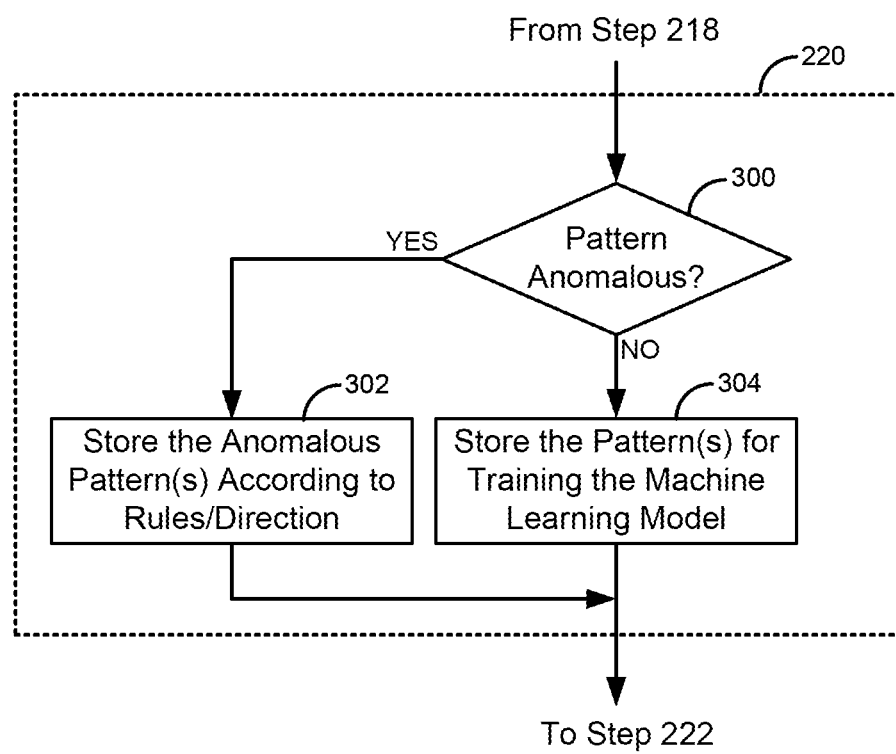
FIG. 3 is a flow diagram of a process for storing patterns for machine learning.

FIG. 3 is a flow diagram of a process for storing patterns for machine learning. FIG. 3 is an exemplary embodiment of step 220 of FIG. 2. After determining that the user 105 has logged out in step 218, the authentication module 103 and/or 121 determines, in step 300, if the pattern(s) that were built in step 212 are anomalous. If the pattern(s) are not anomalous in step 300, the pattern(s) is stored, in step 304, for training by the machine learning module 123 and the process goes to step 222. Step 304 can include actual training of the machine learning model in real-time.

Otherwise, if the pattern is anomalous in step 300, the authentication module 103 and/or 121 stores, in step 302, the anomalous pattern according to rules/direction. For example, the rules may require that each anomalous pattern be stored and flagged as anomalous. In addition, the storage may be based on direction from an administrator. For example, the administrator may indicate a directory to store the anomalous behavior. The stored behavior can then be accessed to display the anomalous usage pattern of the user to the administrator. The process then goes to step 222.

Figure 4:
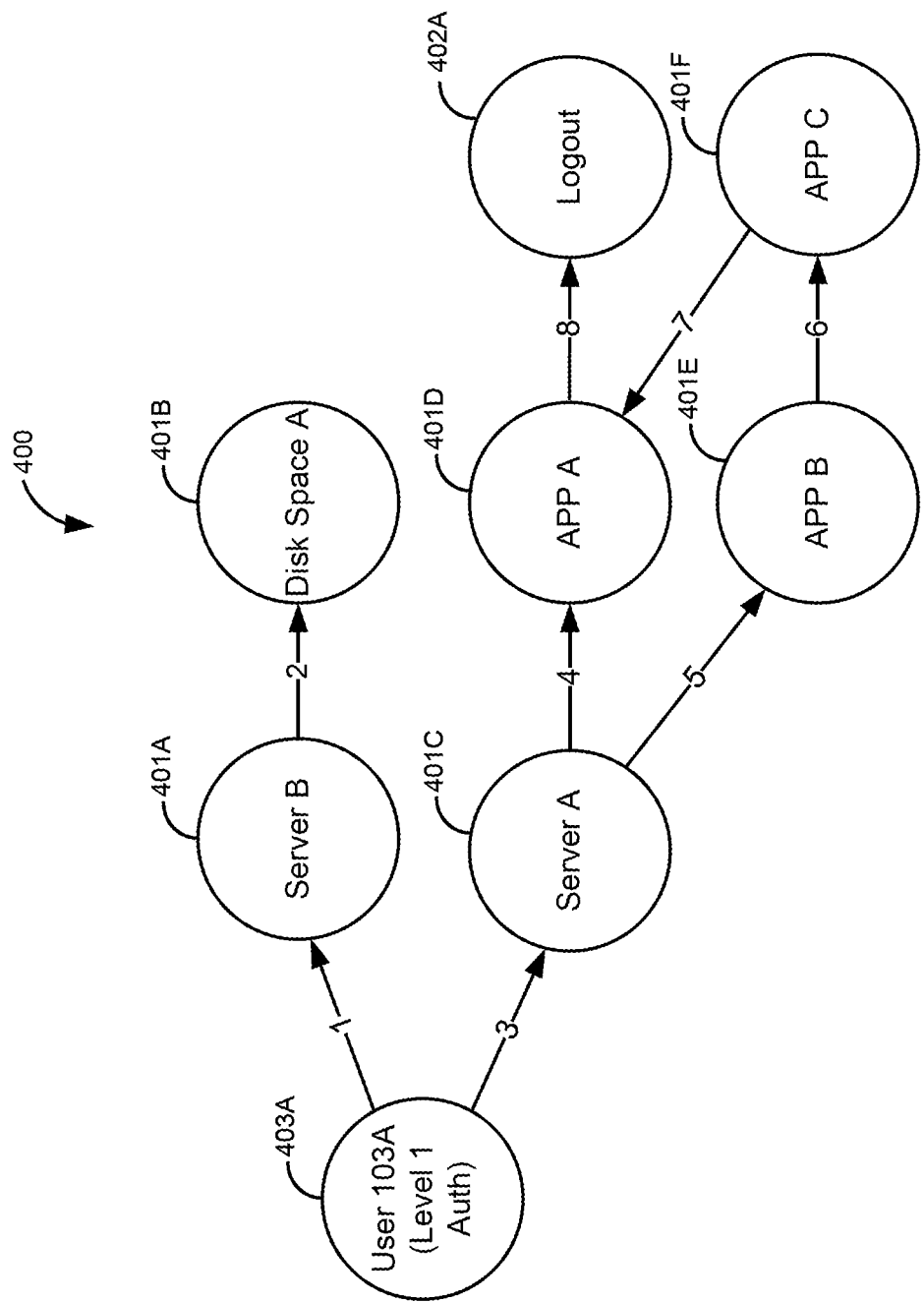
FIG. 4 is a diagram of a usage pattern of a user at a first authentication level.

FIG. 4 is a diagram of a usage pattern of a user 400 at a first authentication level. As the user 105 accesses different resources 104/122, the diagram of the usage pattern of the user 400 can be built. The diagram of the usage pattern 400 comprises an authentication node 403A, resource nodes 401A-401F, and a logout node 402A.

The authentication node 403A is created when the user 105 logs in at an authentication level (i.e., authentication level one). The nodes 401-403 are linked together by lines with a number. The number indicates the order. For example, the link between the authentication level node 403A and the resource node 401A indicates that the user 105 accessed server B first (resource node 401A), then disk space A (resource node 401B), then server A (resource node 401C), then application A (resource node 401D), then application B (resource node 401E), then application C (resource node 401F), then application A again (resource node 401D), and then logged out (indicted by the logout node 402A).

Figure 5:
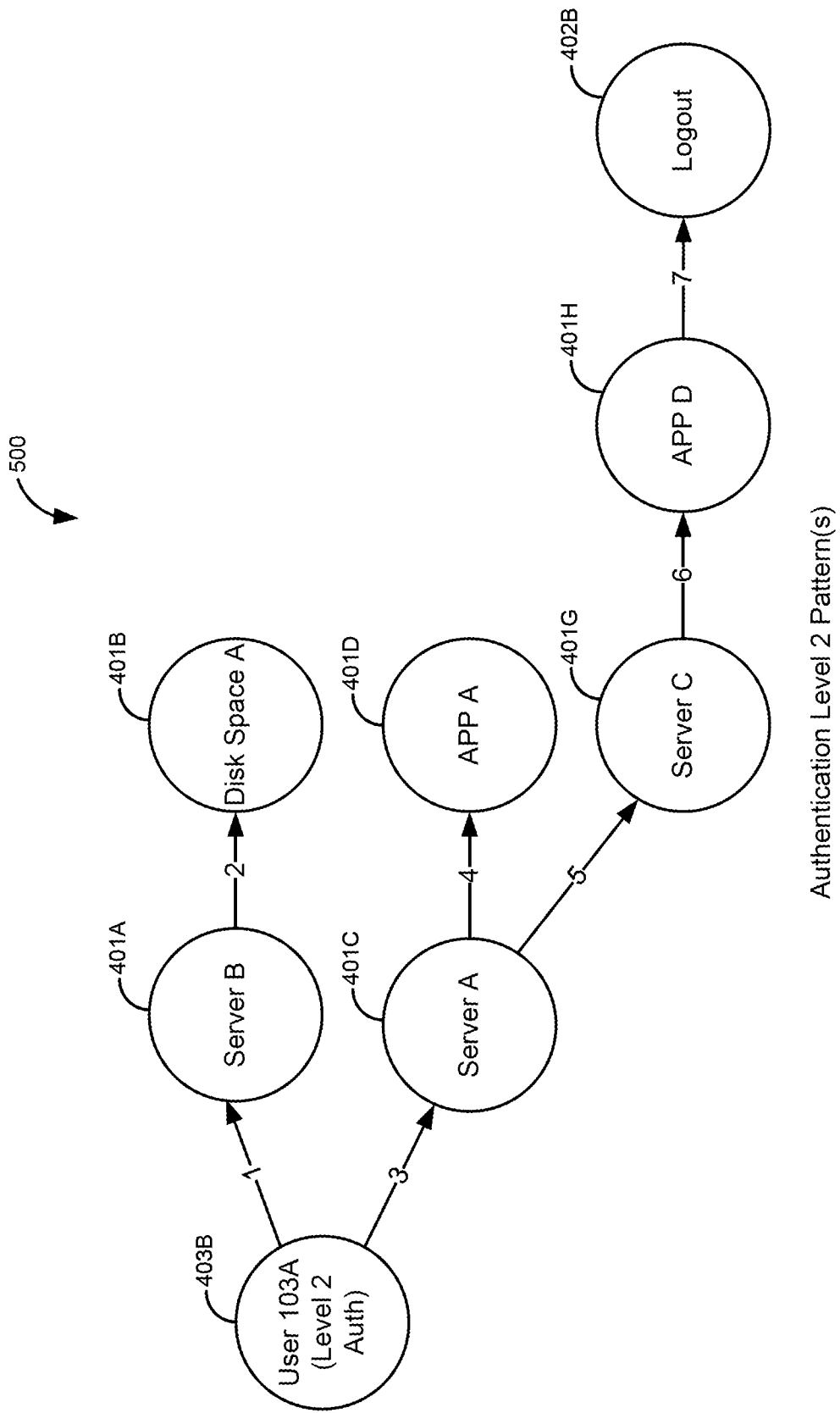
FIG. 5 is a diagram of a usage pattern of a user at a second authentication level.

FIG. 5 is a diagram of a usage pattern of the user 500 at a second authentication level (authentication level two). The user 105 of FIG. 5 is the same user 105 of FIG. 4. The usage pattern of the user 500 comprises an authentication node 403B, resource nodes 401A-401D, resource nodes 401G-401H, and logout node 402B. The numbers of the links also indicate the order. In FIG. 5, the login node 403B indicates that the user 105 logged in at the authentication level two. Like in FIG. 4, the user 105 accessed the server B (resource node 401A), disk space A (resource node 401B), server A (resource node 401C, and application A (resource node 401D) in the same order as shown in FIG. 4. Instead of accessing application B, at authentication two, the user 105 then accessed server C (resource node 401G), then application D (resource node 401H) and then logged out (logout node 402B).

Clearly the usage pattern of the user 400 at authentication level one is different than the usage pattern of the user 500 at authentication level two. For example, the user 105 may not be able to access the server C/application D at authentication level one. Thus, the usage patterns of the user 105 are different based on what authentication level the user 105 is currently authenticated to.

Figure 6:
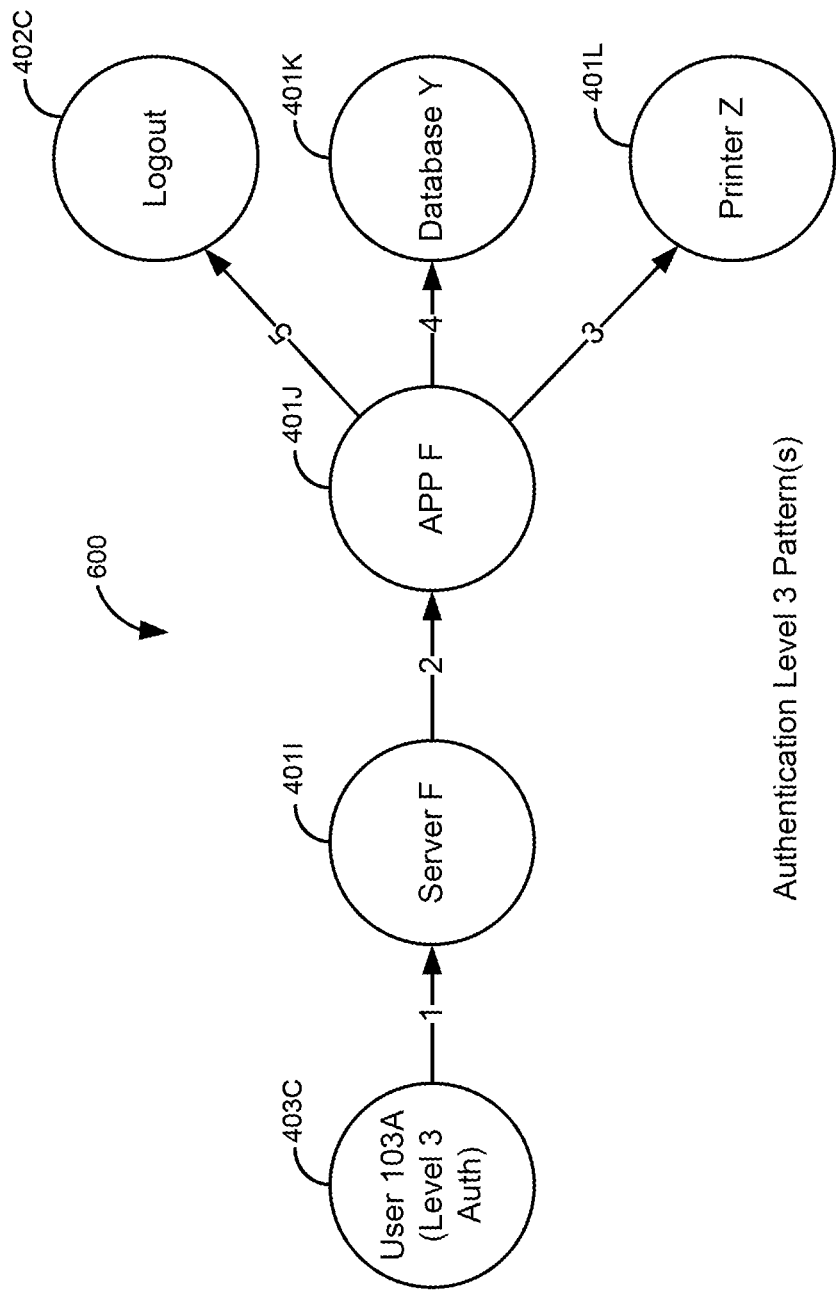
FIG. 6 is a diagram of a usage pattern of a user at a third authentication level.

FIG. 6 is a diagram of a usage pattern of a user 600 at a third authentication level (authentication level three). The user 105 of FIG. 6 is the same user 105 of FIGS. 4-5. The usage pattern of the user 600 comprises an authentication node 403C, resource nodes 401I-401L, and logout node 402C. In FIG. 6, the numbers in the links also show the order. Thus, after the user 105 authenticates (authentication node 403C) at authentication level three, the user 105 accessed the server F (resource node 401I), application F (resource node 401J), printer Z (resource node 401L), and then database Y (resource node 401K). After that, the user 105 logged out (logout node 402C).

As can be seen, the usage pattern of the user 600 at authentication level three is completely different from the usage patterns of the user 400/500 at authentication levels one and two. In FIG. 6, the user 105 accesses completely different resources 104/122 than in FIGS. 4/5. Because the usage patterns 400/500/600 are different at each authentication level, different types of anomalous behavior can be identified at each authentication level. For example, if there is a variance that indicates an anomalous behavior at authentication level one, but the usage patterns at level two do not have a variance, this could indicate that only the user's authentication level one credential(s) have been compromised. On the other hand, if there is anomalous behavior at both authentication level one and authentication level two, this may indicate that both the authentication levels one and two have been compromised.

In addition to the resources 104/122 described in FIGS. 4-6, other types of information associated with the resources 104/122 may be tracked, such as access to devices (e.g., a camera), access via a USB device, access to specific records in a database, to specific files, and/or the like. Moreover, other aspects of the user 105 can be tracked, such as, access times, login times, new accesses, files copied, files moved, whether the user 105 logs in at one level and then authenticates later on at a higher level at a later point in time, whether the user 105 logs in at a higher authentication level first, when the user logs out, and/or the like.

In addition to a single usage pattern of the user 105, there may be multiple patterns identified for the user 105 at the same authentication level. For example, the machine learning module 123 may learn various unique usage patterns of the user 400, 500, and/or 600 over time at one or more of the authentication levels. In this case, each of the different usage patterns of the user 105 are then compared to a current pattern to identify anomalous behavior. The different usage patterns of the user 400/500/600 may be time-based patterns. For example, the user 105 may have a different pattern when the user 105 logs in after lunch versus logging in in the morning. Likewise, the user 105 may have a different usage pattern based on the time of day and/or based on the day.

Figure 7:
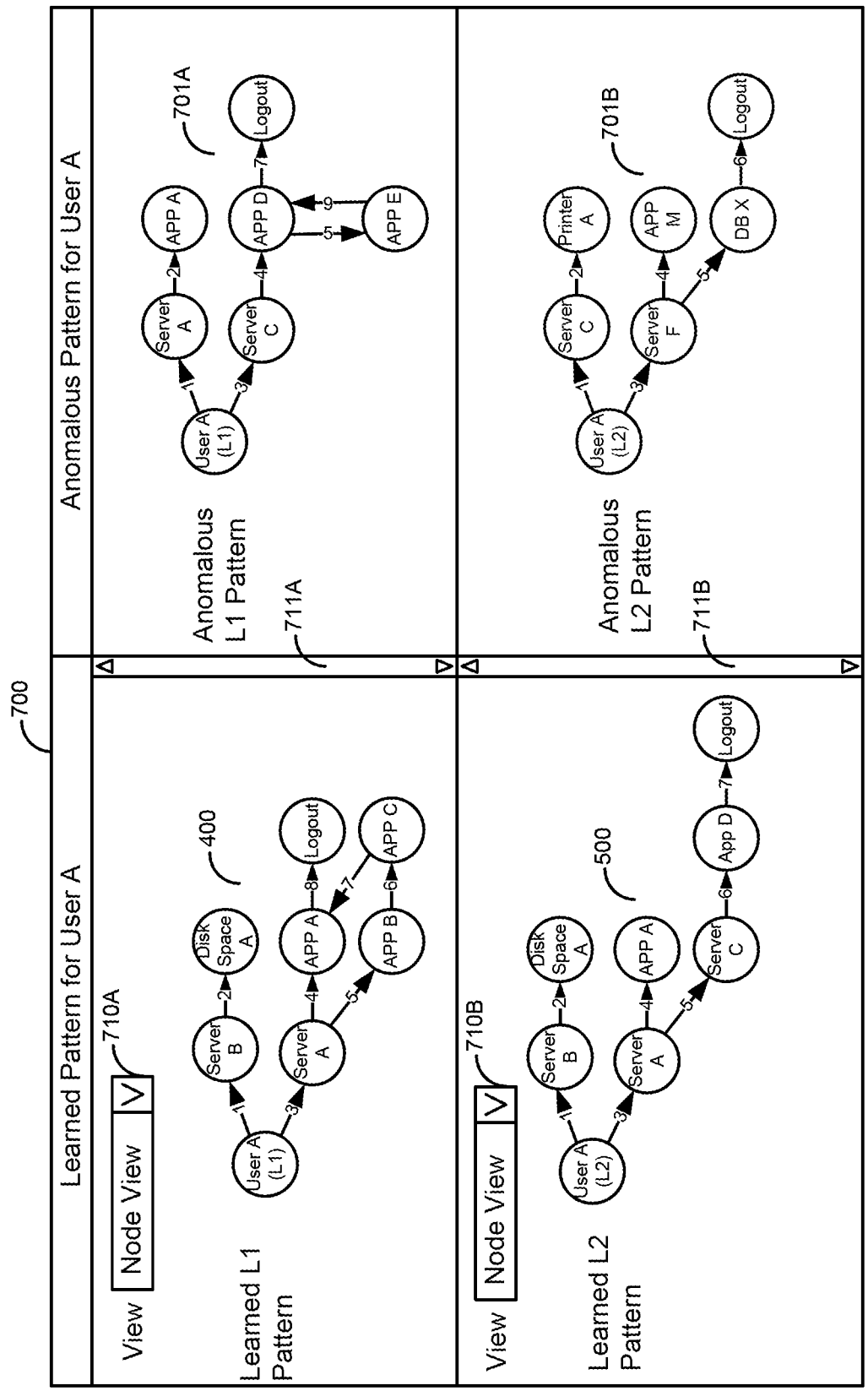
FIG. 7 is a diagram of a graphical user interface that displays usage patterns of a user compared to anomalous usage patterns of the user at multiple authentication levels with a node view.

FIG. 7 is a diagram of a graphical user interface 700 that displays usage patterns of the user 400/500 compared to anomalous usage patterns of the user 701A/701B at multiple authentication levels (authentication levels one and two) with a node view. The node view can be selected by the administrator by selecting the view selection menus 710A and 710B.

The graphical user interface 700 is used by an administrator or security analyst to identify anomalous behavior of the user 105. In FIG. 7, the anomalous usage pattern of the user 701A shows the user 105 accessing server C, application D, and application E that have never been accessed previously at authentication level one. This may indicate a security breach of server C and applications D and E. For example, the user 105 may only have access privileges to the server C and the applications D and E at authentication level two but is now accessing them at authentication level one, which indicates a security breach.

Likewise, the anomalous usage pattern of the user 701B shows that the user 105 is also accessing new resources 104/122 (server F, application M, and database X) at authentication level two. Thus, it appears that authentication level two has also been compromised. In addition, other information may be displayed, such as a calculated variance. For example, the variance may show time differences and/or other variances. The user 105 may have a scrollable list of learned usage patterns of the user 105 that the administrator can scroll through when comparing the current pattern to multiple learned usage patterns of the user 400/500. For example, using the scroll bars 711A/711B, the administrator can scroll and display multiple learned usage patterns of the user 400/500 at the same authentication level to see how the anomalous usage patterns of the user 701A/701B compared to the learned usage patterns of the user 400/500.

In FIG. 7, there are two dropdown menus that allow the administrator to select a view. In FIG. 7, the administrator has selected to display a node view (e.g., nodes that represent a sequence of accesses to the resources 104/122) for both authentication levels.

While FIG. 7 only shows two authentication levels, if the user 105 has additional authentication levels (e.g., authentication level three), the additional authentication levels can also be displayed in the graphical user interface 700.

Figure 8:
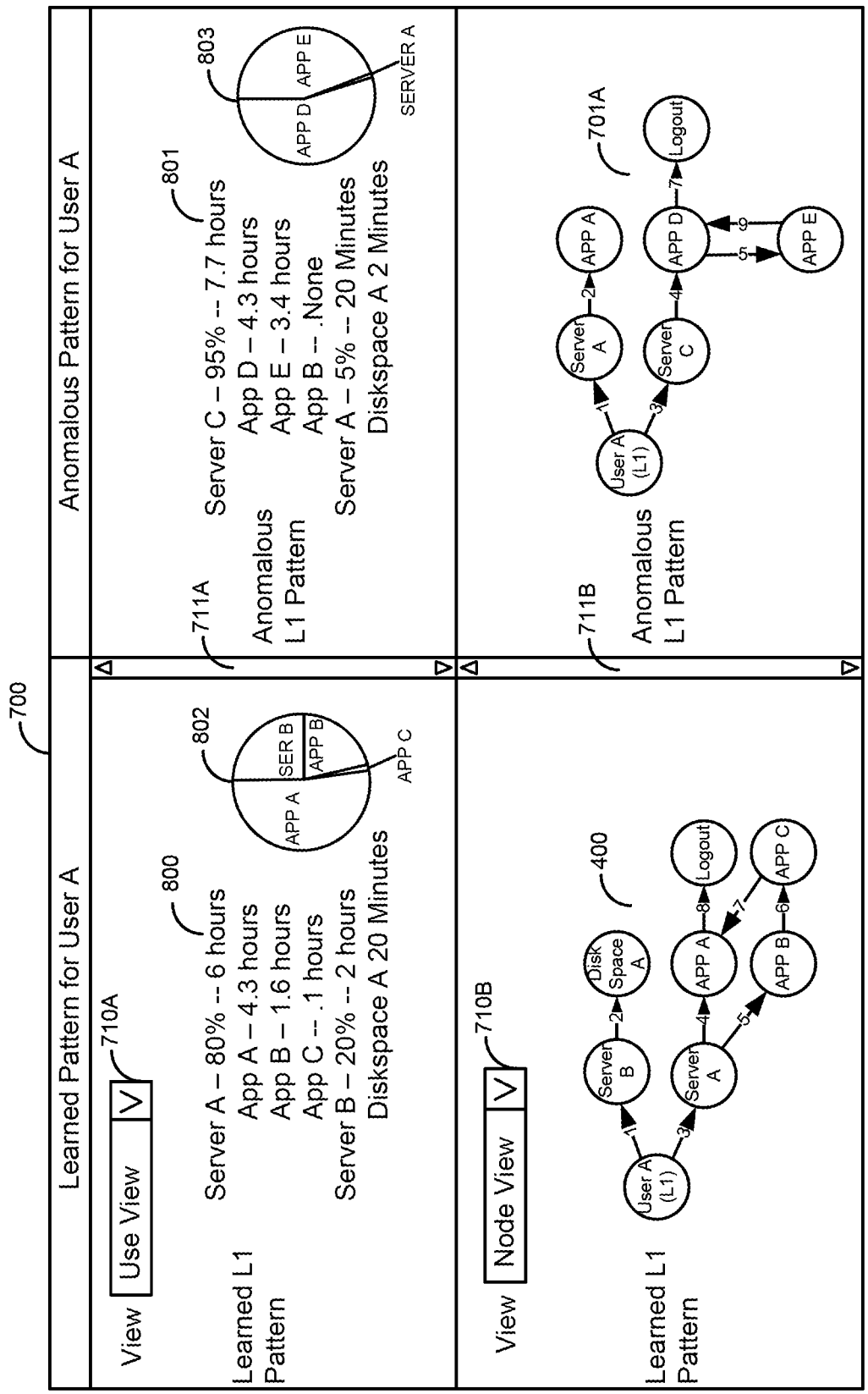
FIG. 8 is a diagram of a graphical user interface that displays usage patterns of a user compared to an anomalous usage pattern of the user at a single authentication level with both a node view and a use view.

FIG. 8 is a diagram of a graphical user interface 700 that displays usage patterns of a user 400 compared to an anomalous usage pattern of the user 701A at a single authentication level with both a node view and a use view. The graphical user interface 700 displays the node view of the authentication level one similar to FIG. 7 (that includes the usage pattern of the user 400 and the anomalous usage pattern of the user 701A. However, instead of the usage pattern of the user 500 at the authentication level two, in FIG. 8, a use view of the usage pattern of the user 800 and an anomalous use view of the usage pattern of the user 801 are displayed for authentication level one.

The use view of the usage pattern of the user 800 also comprises a pie chart of the usage 802. The use view of the usage pattern of the user 800 shows time-based usage statics on how the user 105 is accessing the resources 104/122. For example, the use view of the usage pattern of the user 800 shows that the user 105 accessed server A for six hours (80% of the time). Of those six hours, 4.3 hours were accessing application A, 1.6 hours were accessing application B, and .1 hours were accessing application C. In addition, the user 105 accessed server B for two hours (20% of the time) and accessed diskspace A for twenty minutes.

The anomalous use view of the usage pattern of the user 801 shows that the user 105 accessed the server C for 7.7 hours (95% of the time). Of that time, 4.3 hours were in application D, 3.4 hours were in application E, and no hours in application B (which was used in the usage pattern of the user 400). The user 105 accessed the server A for twenty minutes (5% of the time) and the diskspace A for two minutes. While not shown, the access to the diskspace may also include showing specific files/directories accessed. In addition, other things may be shown, such as an attempted access. The access may include usage of low-level privileged commands. For example, a command to re-write flash memory of a computing device may be displayed.

By also having both the use view and the node view, the administrator can clearly see the anomalous behavior of the user 105 not only in flow, but also in usage time. A similar display could be shown where there are multiple authentication levels where each authentication level is shown as a use view. In addition, other views may be envisioned, such as a time-based view (actual access start/stop times) and/or the like. These other views can be used in conjunction with the node view and use view.

The display may also show the use of low-level authentication commands executed at high authentication levels. The display may indicate the user 105 using high authentication commands to override privileges that he/she may not have (i.e., it okay to use low authentication to edit text file, but only a high authentication level allows editing of password or log files).

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   determining, by a microprocessor, that a user has authenticated to a computer system using a plurality of authentication levels;
   separately tracking, by the microprocessor, behavior of the user at each of the plurality of authentication levels to identify separate usage patterns of the user at each of the plurality of authentication levels;
   identifying, by the microprocessor, anomalous behavior of the user based on one or more variations from the separate usage patterns of the user at, at least one of the plurality of authentication levels; and
   taking, by the microprocessor, an action based on identifying the anomalous behavior of the user,
   wherein the separate usage patterns of the user at each of the plurality of authentication levels comprises a plurality of separate usage patterns of the user at one or more of the plurality of authentication levels, and
   wherein the plurality of separate usage patterns of the user at the one or more of the plurality of authentication levels are based on at least one of: whether the user logs in at a lower authentication level and then logs in at a higher authentication level at a later point in time, and whether the user first logs in at the higher authentication level.

2. The method of claim 1, wherein identifying the anomalous behavior of the user based on the one or more variations from the separate usage patterns of the user at, the at least one of the plurality of authentication levels comprises identifying the anomalous behavior of the user at the lower authentication level, and wherein the action is to send an indication that the lower authentication level of the user may have been or is compromised.

3. The method of claim 1, wherein identifying the anomalous behavior of the user based on the one or more variations from the separate usage patterns of the user at, the at least one of the plurality of authentication levels comprises identifying the anomalous behavior of the user at the lower authentication level and identifying the anomalous behavior of the user at the higher authentication level, and wherein the action is to send an indication that both the lower authentication level of the user and the higher authentication level of the user may have been or is compromised.

4. The method of claim 1, wherein the action taken based on identifying the anomalous behavior of the user comprises: generating for display in a graphical user interface, a diagram that compares at least one of the separate usage patterns of the user at, the at least one of the plurality of authentication levels to an anomalous usage pattern of the user at the at least one of the plurality of authentication levels.

5. The method of claim 4, wherein the at least one of the separate usage patterns of the user comprises the plurality of separate usage patterns of the user.

6. The method of claim 4, wherein the diagram displays at least one of a view where nodes represent a sequence of accesses to resources by the user for the plurality of authentication levels and a use view.

7. The method of claim 1, wherein the action taken based on the identifying the anomalous behavior of the user comprises one or more of: logging the user out of the computer system, locking an account, having an administrator validate that the user's authentication is valid by providing an administrator's credential, blocking an access level, and blocking access to a resource.

8. A system, comprising:
a microprocessor; and
a computer readable medium, coupled with the microprocessor and comprising microprocessor readable and executable instructions that, when executed by the microprocessor, cause the microprocessor to:
determine that a user has authenticated to a computer system using a plurality of authentication levels;
separately track behavior of the user at each of the plurality of authentication levels to identify separate usage patterns of the user at each of the plurality of authentication levels;
identify anomalous behavior of the user based on one or more variations from the separate usage patterns of the user at, at least one of the plurality of authentication levels; and
take an action based on identifying the anomalous behavior of the user,
wherein the separate usage patterns of the user at each of the plurality of authentication levels comprises a plurality of separate usage patterns of the user at one or more of the plurality of authentication levels, and
wherein the plurality of separate usage patterns of the user at the one or more of the plurality of authentication levels are based on at least one of: whether the user logs in at a lower authentication level and then logs in at a higher authentication level at a later point in time, and whether the user first logs in at the higher authentication level.

9. The system of claim 8, wherein identifying the anomalous behavior of the user based on the one or more variations from the separate usage patterns of the user at, the at least one of the plurality of authentication levels comprises identifying the anomalous behavior of the user at the lower authentication level, and wherein the action is to send an indication that the lower authentication level of the user may have been or is compromised.

10. The system of claim 1, wherein identifying the anomalous behavior of the user based on the one or more variations from the separate usage patterns of the user at, the at least one of the plurality of authentication levels comprises identifying the anomalous behavior of the user at the lower authentication level and identifying the anomalous behavior of the user at the higher authentication level, and wherein the action is to send an indication that both the lower authentication level of the user and the higher authentication level of the user may have been or is compromised.

11. The system of claim 8, wherein the action taken based on identifying the anomalous behavior of the user comprises: generating for display in a graphical user interface, a diagram that compares at least one of the separate usage patterns of the user at, the at least one of the plurality of authentication levels to an anomalous usage pattern of the user at the at least one of the plurality of authentication levels.

12. The system of claim 11, wherein the at least one of the separate usage patterns of the user comprises the plurality of separate usage patterns of the user.

13. The system of claim 11, wherein the diagram displays at least one of a view where nodes represent a sequence of accesses to resources by the user for the plurality of authentication levels and a use view.

14. The system of claim 8, wherein the action taken based on the identifying the anomalous behavior of the user comprises one or more of: logging the user out of the computer system, locking an account, having an administrator validate that the user's authentication is valid by providing an administrator's credential, blocking an access level, and blocking access to a resource.

15. A non-transient computer readable medium having stored thereon instructions that cause a processor to execute a method, the method comprising instructions to:
determine that a user has authenticated to a computer system using a plurality of authentication levels;
separately track behavior of the user at each of the plurality of authentication levels to identify separate usage patterns of the user at each of the plurality of authentication levels;
identify anomalous behavior of the user based on one or more variations from the separate usage patterns of the user at, at least one of the plurality of authentication levels; and
take an action based on identifying the anomalous behavior of the user,
wherein the separate usage patterns of the user at each of the plurality of authentication levels comprises a plurality of separate usage patterns of the user at one or more of the plurality of authentication levels, and
wherein the plurality of separate usage patterns of the user at the one or more of the plurality of authentication levels are based on at least one of: whether the user logs in at a lower authentication level and then logs in at a higher authentication level at a later point in time, and whether the user first logs in at the higher authentication level.

16. The non-transient computer readable medium of claim 15, wherein identifying the anomalous behavior of the user based on the one or more variations from the separate usage patterns of the user at, the at least one of the plurality of authentication levels comprises identifying the anomalous behavior of the user at the lower authentication level, and wherein the action is to send an indication that the lower authentication level of the user may have been or is compromised.

17. The non-transient computer readable medium of claim 15, wherein identifying the anomalous behavior of the user based on the one or more variations from the separate usage patterns of the user at, the at least one of the plurality of authentication levels comprises identifying the anomalous behavior of the user at the lower authentication level and identifying the anomalous behavior of the user at the higher authentication level, and wherein the action is to send an indication that both the lower authentication level of the user and the higher authentication level of the user may have been or is compromised.

18. The non-transient computer readable medium of claim 15, wherein the action taken based on identifying the anomalous behavior of the user comprises: generating for display in a graphical user interface, a diagram that compares at least one of the separate usage patterns of the user at, the at least one of the plurality of authentication levels to an anomalous usage pattern of the user at the at least one of the plurality of authentication levels.

19. The non-transient computer readable medium of claim 18, wherein the diagram displays at least one of a view where nodes represent a sequence of accesses to resources by the user for the plurality of authentical levels and a use view.

20. The non-transient computer readable medium of claim 15, wherein the action taken based on the identifying the anomalous behavior of the user comprises one or more of: logging the user out of the computer system, locking an account, having an administrator validate that the user's authentication is valid by providing an administrator's credential, blocking an access level, and blocking access to a resource.

* * * * *